US008864178B2

United States Patent
Krug, Jr. et al.

(10) Patent No.: US 8,864,178 B2
(45) Date of Patent: *Oct. 21, 2014

(54) APPARATUS FOR QUICK CONNECTS USED IN A COMPUTING SYSTEM ENVIRONMENT

(75) Inventors: Francis R. Krug, Jr., Highland, NY (US); Robert K. Mullady, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/607,707

(22) Filed: Sep. 8, 2012

(65) Prior Publication Data

US 2012/0326432 A1 Dec. 27, 2012

Related U.S. Application Data

(63) Continuation of application No. 12/103,094, filed on Apr. 15, 2008, now Pat. No. 8,272,670.

(51) Int. Cl.
*F16L 11/12* (2006.01)
*F16L 59/02* (2006.01)

(52) U.S. Cl.
CPC .................................. *F16L 59/024* (2013.01)
USPC ............................................. 285/45; 285/316

(58) Field of Classification Search
USPC .............. 285/45, 316, 47, 419, 315, 116, 314
See application file for complete search history.

(56) References Cited

U.S. PATENT DOCUMENTS

| | | | |
|---|---|---|---|
| 3,711,632 A | 1/1973 | Ghirardi | 285/419 |
| 4,114,929 A * | 9/1978 | Knapp | 285/45 |
| 4,176,756 A | 12/1979 | Gellman | 285/419 |
| 4,219,693 A | 8/1980 | French | 285/45 |
| 4,405,161 A | 9/1983 | Young et al. | 285/45 |
| 4,422,675 A | 12/1983 | Norris et al. | 285/45 |
| 4,426,108 A | 1/1984 | Kesselman | 285/45 |
| 4,432,759 A | 2/1984 | Gross et al. | 285/419 |
| 4,452,097 A | 6/1984 | Sunkel | 285/419 |
| 4,456,287 A | 6/1984 | Bisonaya | 285/354 |
| 4,600,220 A | 7/1986 | Agnelli | 285/45 |
| 4,615,543 A | 10/1986 | Cannon | 285/419 |
| 4,728,130 A | 3/1988 | Corzine | 285/318 |
| 4,795,197 A | 1/1989 | Kaminski et al. | 285/419 |
| 4,822,293 A | 4/1989 | Robson | 439/559 |
| 5,015,013 A | 5/1991 | Nadin | 285/419 |
| 5,266,740 A * | 11/1993 | Hsu | 285/45 |
| 5,347,084 A | 9/1994 | Roney et al. | 174/92 |
| 5,374,085 A | 12/1994 | Beatrice et al. | 285/316 |
| 5,531,695 A | 7/1996 | Swisher | 285/45 |
| 5,647,612 A | 7/1997 | Yoshida et al. | 285/13 |

(Continued)

FOREIGN PATENT DOCUMENTS

WO   WO/2008/049989   *  2/2008

*Primary Examiner* — David E Bochna
(74) *Attorney, Agent, or Firm* — Margaret A. McNamara; Ido Tuchman

(57) ABSTRACT

A protective sleeve for quick connect fittings and couplings of a computer system environment. In one embodiment, a protective sleeve with a hollow center is provided that once disposed around the quick connect fittings will protect against leakage of liquids flowing into quick connect fittings during mating and unmating of them. The sleeve comprises an actuation collar area that extends over unmated portion of the quick connect fitting and a flare area disposed over the actuation collar to provide an additional gripping area for actuating the quick connect fitting.

6 Claims, 5 Drawing Sheets

(56) References Cited

U.S. PATENT DOCUMENTS

| | | | |
|---|---|---|---|
| 5,684,274 A | 11/1997 | McLeod | 174/92 |
| 5,816,853 A | 10/1998 | Buekers et al. | 439/521 |
| 5,853,200 A | 12/1998 | Zieres | 285/45 |
| 6,171,132 B1 | 1/2001 | Schmidt | 439/369 |
| 6,311,734 B1 | 11/2001 | Petrovic | 285/45 |
| 6,881,901 B2 | 4/2005 | Egan | 174/665 |
| 7,186,127 B2 | 3/2007 | Montena | 439/277 |
| 7,214,095 B1 | 5/2007 | Mathews | 439/578 |
| 7,628,428 B2 | 12/2009 | Rampton et al. | 285/45 |
| 7,695,022 B2 | 4/2010 | Wells | 285/45 |
| 7,798,837 B1 | 9/2010 | Gardner et al. | 439/296 |
| 7,838,775 B2 | 11/2010 | Montena | 439/523 |
| 7,887,097 B2 | 2/2011 | Blivet | 285/45 |
| 8,062,045 B2 | 11/2011 | Montena | 439/588 |
| 8,272,670 B2 * | 9/2012 | Krug et al. | 285/45 |
| 2003/0184083 A1 | 10/2003 | Linam et al. | 285/45 |

\* cited by examiner

APPARATUS FOR QUICK CONNECTS USED IN A COMPUTING SYSTEM ENVIRONMENT

CROSS-REFERENCE TO RELATED APPLICATIONS

This application claims priority under 35 U.S.C. §120 to U.S. Pat. No. 8,272,670 issued Sep. 25, 2012, the entire text of which is specifically incorporated by reference.

BACKGROUND OF THE INVENTION

1. Field of the Invention

This invention relates to cooling of computing environments and more particularly to water cooling of large computing systems.

2. Description of Background

The industry trend has been to continuously increase the number of electronic components inside computing systems. A computing system can include a simple personal computer, a network of simple computers, or one or even a network of large computers that include one or more central electronic systems (CEC). While increasing the components inside a simple computing system does create some challenges, however, such an increase can create many problems in computing systems that include one or more large computers. In such instances many seemingly isolated issues affect one another, especially when packaged together in a single assembly or networked or housed to other systems that are stored in close proximity. In addition, the increased density of these systems give to the increase in their energy consumption and, consequently, the rise in their internal temperatures due to the collective heat. Consequently, the issue of heat dissipation has become a priority in the design of these computers.

In the past air cooling concepts has been used extensively in the design of these computers. However, as the advancements in heat sink and fan design is beginning to outpace air cooling capabilities, further alternatives are becoming more attractive. In recent years, liquid and especially water cooling have become a more attractive and viable option. The advantages of fluid/liquid and specifically water cooling, are many including fluid/liquid/water's higher specific heat capacity, density and thermal conductivity. In addition, such cooling methods will allow the heat to be transported away from the source to secondary cooling surfaces that allow for larger and more optimally designed cooling techniques when feasible. Unfortunately, running liquids and especially water through a device that is largely powered by electricity can be risky and dangerous. In order to reduce a risk of leakage it is optimal, in these situations, to use as few fittings and connectors as possible in such cases with respect to piping that provides the coolant to the system. Unfortunately, this is not always feasible and therefore, there is a need to provide safety features when there is a need to provide piping especially those with many fittings and connectors to reduce risk of leakage. In particular there is a need for a method and apparatus that can control liquid/water sprays that might occur when quick connects (hereinafter QC's) fittings are used to help adapt pipings of different sizes or shapes to one another, or to regulate fluid flow during the use, mating or unmating of them within a computing system.

SUMMARY OF THE INVENTION

The shortcomings of the prior art are overcome and additional advantages are provided through the provision of a method and incorporated assembly for providing an insulating housing and a protective sleeve for quick connect fittings and couplings of a computer system environment. In one embodiment, the insulative housing has a hollow center to be placed around the couplings and further comprises an insulative sleeve having a plurality of complementary parts that fit together around the coupling as a singular unit and a fastener to open and close the sleeve such that the coupling is at least partially exposed. In an alternate embodiment, a protective sleeve with a hollow center is provided that once disposed around the quick connect fittings, will protect against leakage of liquids flowing into quick connect fittings during mating and unmating of them. The sleeve comprises an actuation collar area that extends over unmated portion of the quick connect fitting and a flare area disposed over the actuation collar to provide an additional gripping area for actuating the quick connect fitting.

Additional features and advantages are realized through the techniques of the present invention. Other embodiments and aspects of the invention are described in detail herein and are considered a part of the claimed invention. For a better understanding of the invention with advantages and features, refer to the description and to the drawings.

DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
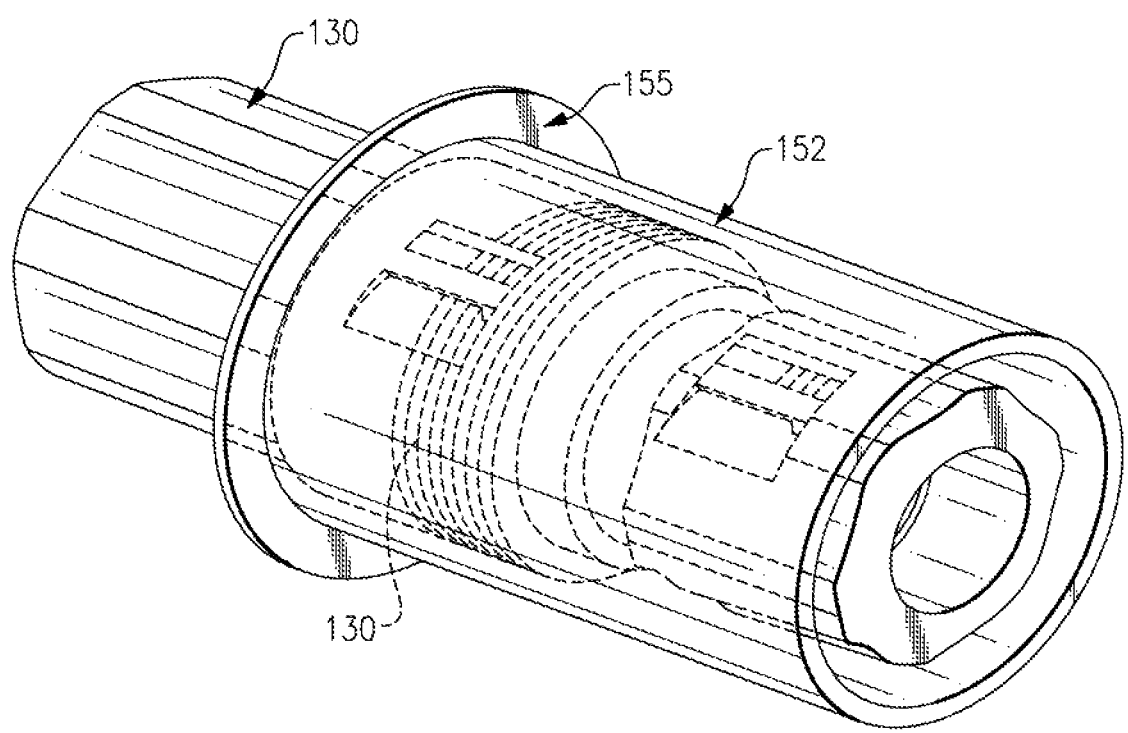
FIG. 1 is an illustration of one embodiment of the present invention using a male and female type quick connect fitting.

FIG. 1 is an illustration of one embodiment of the present invention. In the example shown in FIG. 1, a male and female type quick connect fitting is shown. For ease of understanding, the male fitting is referenced as 110 while the female fitting is referenced as 120. In this particular example, the male and female fittings are already engaged as shown. It should be noted that once engaged, the two portions of the quick connect fittings 110 and 120 are surrounded by an actuation sleeve that provides somewhat of a protection to fluid leakage. The actuation sleeve is shown in both FIGS. 1 and 2 and referenced by numerals 130.

Although, not shown in the figures, each male and female fitting will also be connected to piping on the side opposing where they are engaged with one another. The coolant fluids and liquids like water will be flowing through the piping connected to the female fitting into the male and female fitting and then into the male fitting as can be appreciated when source of coolant is provided in the computer environment to provide cooling to the intended source.

As discussed earlier, whenever fluid/liquid coolants such as water are involved and there is a mating connection such as the fitting shown by way of example in FIG. 1, there is always a possibility that the connection is not completely sealed. Even the use of sealants may be affected due when exposed to long term stress and temperature changes. In addition, there are times, when the mating and unmating of the fittings as shown has to be conducted while the fluid or liquid is still flowing in the pipeline. Having to shut the coolant source may pose additional challenges during installation and servicing of the computer.

In FIG. 1, as per one embodiment of the present invention, illustrates a protective sleeve (with a hollow center) that is provided around the area where the fittings are to be connected/mated to one another. The protective sleeve is referenced by numerals 152 in the figure as shown.

This protective sleeve controls any leakage or generally any sprays from getting on the sensitive electronic components in the surrounding areas. The first is a protective sleeve is comprised of an actuation collar area, referenced by numerals 152, in the figure. The second is a flared area, referenced by numerals 155, in the figure. In a preferred embodiment, the flared area actually provides an additional grip area to actuate the quick connect as can be seen in the illustration of FIG. 1. It should be noted also that while in this particular example, it may be preferred to have the flared area 155 around the female fitting of the quick connect, this is not a restriction and it is possible in alternate embodiments to have the flared area 155 in other areas surrounding the quick connect fittings.

Figure 2:
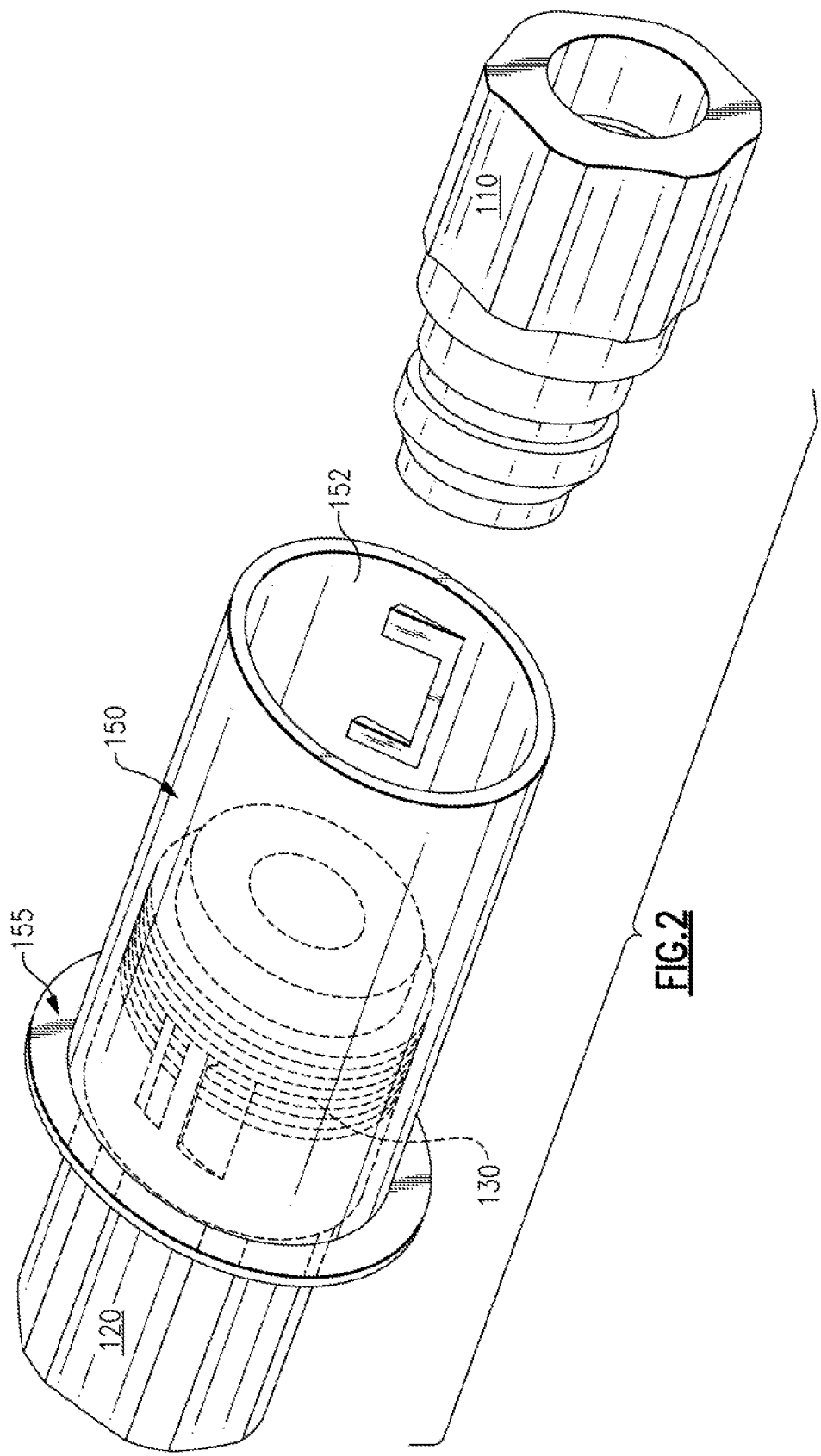
FIG. 2 provides an illustration of a protective sleeve as per embodiment of the present invention.

FIG. 2 provides an illustration of the protective sleeve 150 as per embodiment of the present invention when the quick connect fittings are disengaged. The same male 110 and female 120 fittings are used again in the example illustrated in FIG. 2 for ease of understanding and reference. As discussed earlier, while it is preferable in this particular example to have the protective sleeve remaining around the female fitting 120 of the quick connect once the two fittings are disengaged (as shown), this can easily be altered selectively, in other embodiments as desired.

As can be appreciated from looking at this figure, once the quick connect male 110 and female 120 fittings are unmated, the protective sleeve acts as a shield and will control any liquids/fluids such as water that might spray to the adjacent electronic components. This is due to the fact that the collar area 152 extends well beyond the female portion 120 (in this example).

The illustration of provided by FIGS. 1 and 2, shows a preferred embodiment of the present invention where at least the collar area 152 is made from a clear material, more particularly a clear plastic.

In addition, while the illustrations as provided in FIGS. 1 and 2 provide for a design of the sleeve that seems to be unitary, this is not always the case. While a unitary design that is made from a sufficiently flexible material that can be disposed in place securely around one part of the quick connect fittings is plausible, the illustration of FIG. 3 provides a different and alternative design for the present invention.

Figure 3:
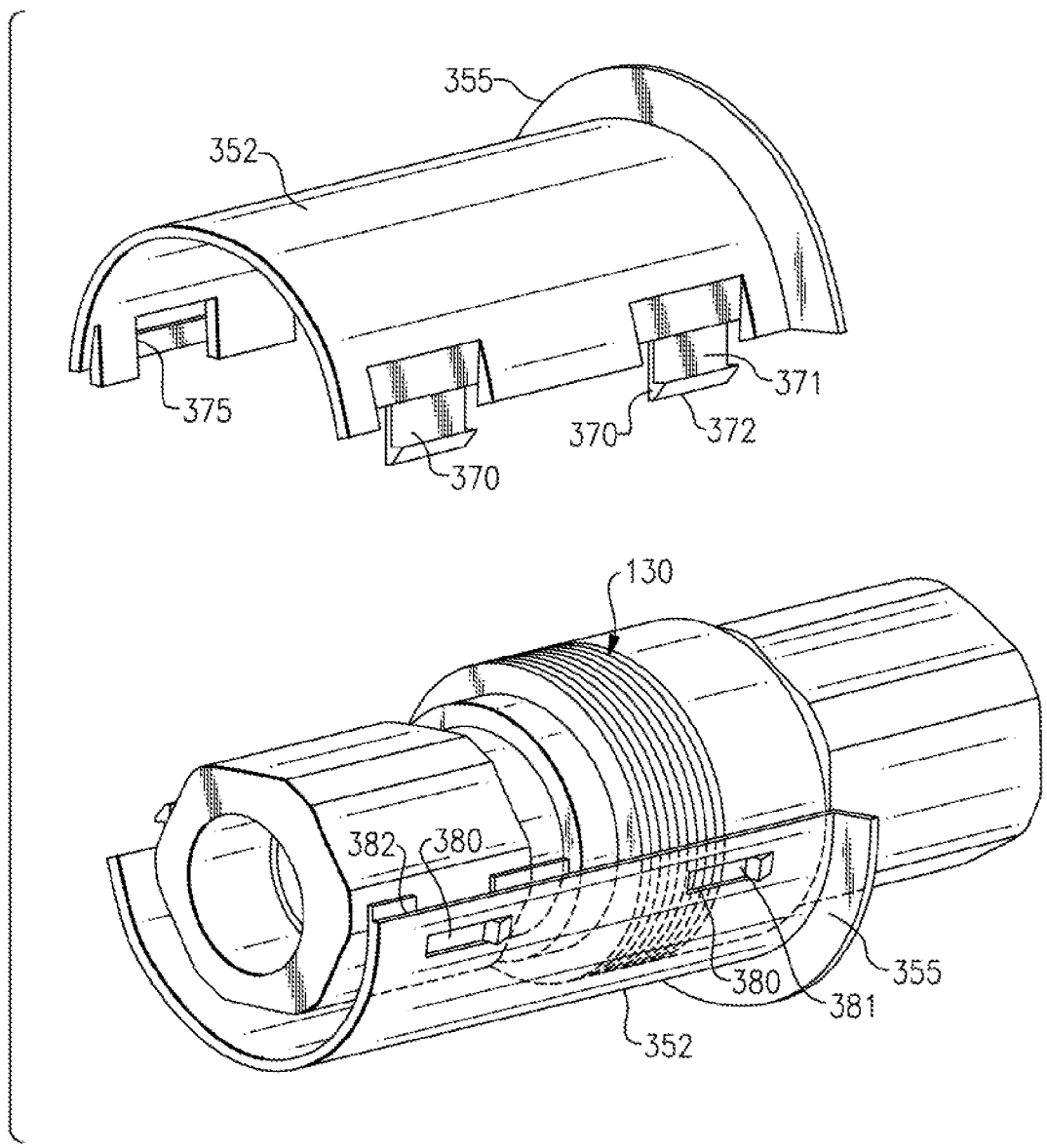
FIG. 3 provides an illustration of fastening components provided as part of the shielding housing of the embodiment of FIG. 1.

As stated, FIG. 3 provides an alternate embodiment of the present invention where the protective sleeve, previously referenced as 150 in FIGS. 1 and 2, is created from a plurality of pieces. In the embodiment shown, for ease of understanding, there are two sleeve pieces and these can be made from the same material and/or part if desired. In the illustration of FIG. 3, numerals 350 are picked to reflect the differences between the two embodiments, although once the two pieces of FIG. 3 are engaged, they will appear as the same unitary unit as was illustrated and discussed in the previous figures.

In the embodiment illustrated in FIG. 3, the two pieces of sleeve are substantially the same but have complementary latching parts. For this reason, the two pieces are identified both as 300. The latching parts 370 and 380 can be either formed and molded from the same material, hence making the two parts of sleeve 300, complementary or they can be an added features that gets added to the sleeve counterparts 300. In either case the two pieces 370 and 380 will fasten to one another securely to render the sleeve a unitary unit as discussed. As known to those skilled in the art, a number of fastener such as latching and mating, can be used in alternate embodiments to connect the sleeve pieces 300 securely to one another. In the example of FIG. 3, in one embodiment, the fasteners 370 have protrusions, 371, that are placed inside perforations, 381, in their complementary counterpart 380. The fasteners 370 further comprise a lip, 372, extending from the protrusions once disposed in the perforations of 380 that extend out to render the connection even more secure.

In another embodiment, the fastener 370 can have perforations 375, while the fastener 380 has protrusions 381. As used in this example, a variety of such means can be used in a single sleeve design as desired to ensure a very secure fit of the two complementary counterpart sleeves 300.

As was the case previously, in FIG. 3, the invention is designed taking into account that a quick connect with an actuation sleeve 130 is provided, here on the female coupling which is rather used in conventional fittings. This, however, is by way of example and other designs can be selectively used. FIG. 3 also provides a preferred embodiment where a clear plastic shield used and created around this actuation sleeve 130 using the two complementary pieces or parts 300 as discussed. It should be noted again that these pieces or parts snap together around the actuation sleeve 130 in this case and are retained. The fact that they can be placed around the piping (because of the two piece complementary design) before or during the mating of the fittings, will make this design very functional and easy to use during installation and servicing. The same an additional flared area, now referenced as 355 still provide an additional grip area to actuate the QC. As the QC's are mated and unmated the shield will control any water that might spray to adjacent electronic components.

Figure 4:
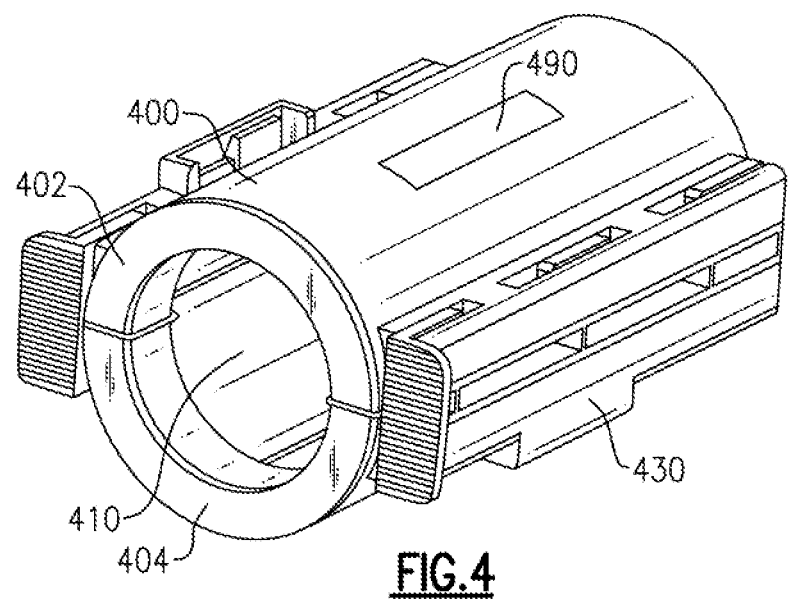
FIG. 4 provides yet another alternative embodiment for the present invention illustrating an insulative housing.

FIG. 4 provides yet another alternative embodiment for the present invention illustrating an insulative housing 490, comprised of an insulative sleeve 400 and fastener 430. The housing has a hollow center 410 such that it can be disposed around a coupling or piping etc. of a computer or a computing environment. This design as provided in his embodiment, is to address another issue that has not been resolved by the prior art which will be presently discussed.

When quick connects (QC's) are used carrying substances, such as the fluid/liquid coolants discussed above certain problems arise when these substances having temperatures that are below dew point as they can cause condensation. Condensation may also form in other situations due to particular shipping or storage requirements of the computers. In either case, when condensation is a possibility, the QC's need to be insulated to prevent condensation from forming which will hurt the sensitive electronics that reside in the surrounding areas. The alternate embodiment of the present invention, as provided in FIGS. 4 through 7, provides such a protection.

FIG. 4 provides an illustration of an insulative sleeve, as referenced by numerals 400 in the figure. The insulative sleeve 400 can be used on a variety of piping provided in a computing environment, such as for example, on an IBM modular refrigeration unit (MRU). In this example, the insulative sleeve 400 comprises of two, preferably molded parts, referenced by numerals 402 and 404 respectively. The two molded parts, 402 and 404, will also be referenced as first sleeve component and second sleeve component 402 and 404. These components are held together with a fastener 430. The fastener is illustrated and referenced by numerals 430 in the figure. In a preferred embodiment, the fastener 430 is comprised of latches. In addition, in the exemplary design provided in FIGS. 4 through 7, the two molded 402 and 404 parts are used to create a clamshell concept.

Figure 5:
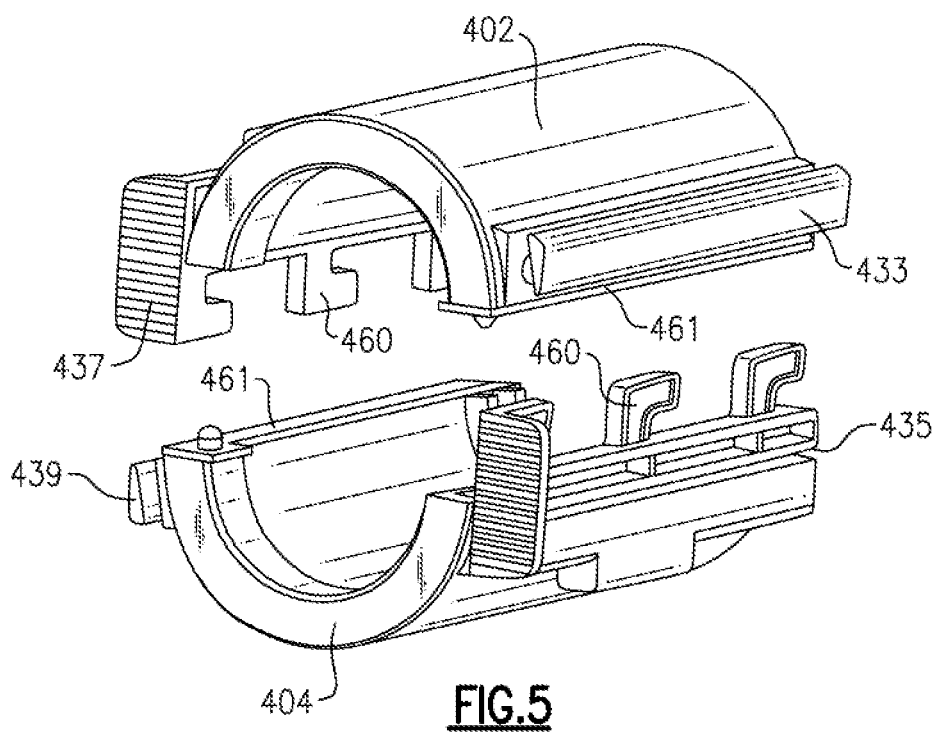
FIG. 5 is an illustration of the insulative sleeve provided as part of the insulative housing of the embodiment of FIG. 4.

FIG. 5 provides the same insulative sleeve as discussed in conjunction with the embodiment of FIG. 4, while the two parts 402 and 404 are not engaged with one another to provide a unitary unit. In this figure, it is easier to see the particular fastener used as well. As illustrated, in this embodiment, the fastener 430, that was previously reflected as a unitary unit is also comprised of two parts. In this example, two fastener are provided on each side of the insulative sleeve (collectively referenced previously as 400). Each fastener, is further broken down into a plurality of components, in this case referenced as 433, 435, 437 and 439. It is possible to utilize only one fastener with two or more components or use more than two fasteners with a single component or many components as can be appreciated by those skilled in the art. In this embodiment, however, the above mentioned components are used to create ease of understanding.

The parts 433 and 435 are complementary to one another as well as parts 437 and 439. In this example fastening components 433 and 437 are both attached to what will be referenced because of the positioning of the figure as upper insulative sleeve component 402. Similarly, fastening components 435 and 439 are attached to the lower insulative sleeve component 404. While, fastening components 433 is attached like fastening component 437 to the upper insulative component 402, and while fastening component 433 is complementary to that of 435 while component 437 is also complementary to 439, fastening components 433 and 437 are intentionally chosen in this example not to have identical or even similar design. In other alternate embodiments, it is possible to provide similar designs for these components but in the present case, an example with dissimilar fastening components is chosen for ease of understanding. In fact, in this particular example, fastening components 435 and 437 both will have protruding parts, reference by numerals 460, that will be disposed in complementary receptacles, referenced as 461, provided in components 433 and 439 to make the fastening possible.

Figure 6:
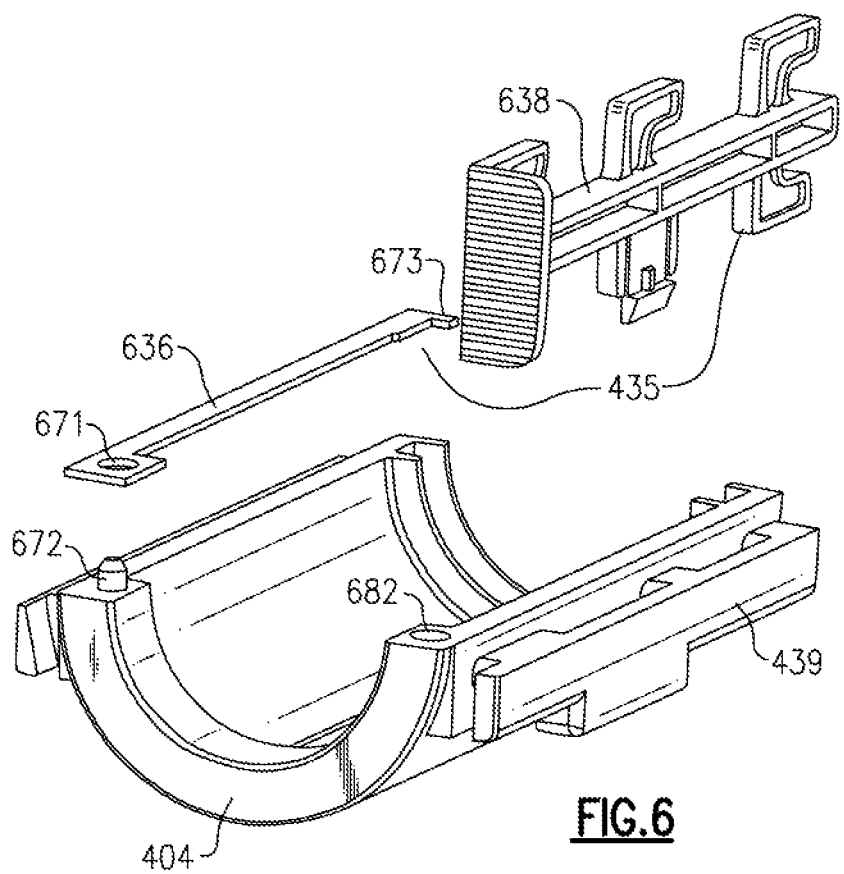
FIG. 6 provides an illustration of fastening components provided as part of the insulative housing of the embodiment of FIG. 4.
Figure 7:
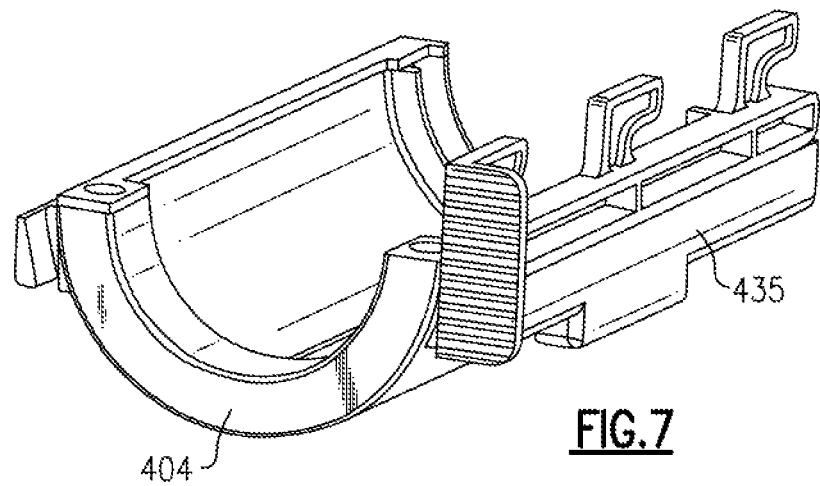
FIG. 7 provides an illustration of different elements of the fastening component of FIG. 6 after they have been assembled.

The fastener and their components can also be either integral with the insulative sleeve or its components or be fabricated such that it can be disposed on the sleeve. This latter option as illustrated in FIGS. 6 and 7 is preferable because it allows the insulative sleeve components to be fabricated to be exactly identical if desired. In a preferred embodiment, the sleeve and its component, if any, will be molded out of plastic.

FIG. 6 illustrates how the fastening components themselves may comprise of elements that allow the fastening component to be disposed securely on the sleeve component. In the example shown in FIG. 6, a rotated view of lower sleeve component 404 of the previous figure is replicated. As can be viewed, the lower sleeve component 404 has fastening component 439 disposed on one side. One the opposing side a disassembled view of what was fastening component 435 is shown.

As illustrated, the fastening component 435, comprises of a first element 636 and a second element 638. The first element 636 is simply disposed over an edge or an inner thickness of the sleeve component 404. The first element is then engageable with the sleeve component. For example, in the illustration, an opening 671 is provided for this first element which will fit into the protrusion provided on the sleeve component 404 them t, and referenced by numeral 672 to engage them together. In this embodiment, it is important to note two design features. The first element 636 is a substantially flat and thin plane that can easily be disposed between the two sleeve components 404 and 402 without causing any gaps in their fit. In addition, the protrusion 671, provided on the sleeve component 404, in this embodiment is added as an additional securing feature to ensure a tighter fit between the sleeve components. The protrusion 672 will engage with an opening provided on the upper sleeve component 402 (not illustrated here) which will be substantially similar to the opening on the other side of the sleeve component, referenced by numerals 682. The opening 682, in turn will have a complementary protrusion on the upper sleeve component 402 that will fit securely into it which is similar to the protrusion indicated by numerals 472 on this portion of the sleeve. (Note that for the design of latter sleeve component using 682, different engageable means than the opening 671 will be used.)

A second element, referenced by numerals 638, of the fastener 435, will then fit in with the first element 636 to allow the latching function. This second element 638 can be secured to the first element 636 by means of a variety of complementary mating means such as the one provided and referenced by numerals 673 in the figure. Although, only one mating half (on the first element 636) is visible from the viewing angle provided in the figure, it can be appreciated, that a similar mating half is also disposed on the second element 638. FIG. 7 provides an illustration of the two elements of the fastening component 435 once assembled.

Reviewing FIGS. 4 through 7 in conjunction with one another, the concept introduced by this preferred embodiment of the present invention, provide for a unitary insulative housing having two molded parts. One can be thought of as a basic insulation sleeve and the other is a latch. In this example, each part was used twice to create a clamshell effect. In this embodiment, the latch is inserted into the housing and a feature captivates it on the housing. The latch itself is comprised of two parts.

These housing is placed around a coupling or housing in parts. When the two (or more) parts of the housing are around the coupling, pushing forward on the one latch will lock the top and bottom housings together and then pushing the latch on the other side will lock that side of the housings together completing the attachment. At this point the coupling becomes encased in the housing that will provide thermally insulation for the coupling. The fastener (i.e. the latch) in this way can be opened and closed also to disengage the sleeve from its components partially and/or alternatively to at least partially expose the coupling.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:
1. A protective sleeve system to protect leakage of liquids during mating and unmating of fittings in a computer, comprising:
    a quick connect fitting for receiving a liquid, the quick connect fitting including an unmated end for engaging a mated fitting; and a protective sleeve having a hollow center and a plurality of complementary pieces that fit together and fasten to only one of a female pipe fitting and a male pipe fitting of the quick connect fitting, the protective sleeve including:
an actuation collar area that extends beyond the unmated end of said quick connect fitting;
fasteners to open and close the protective sleeve such that the unmated end is at least partially exposed when the protective sleeve is open; and
a flare area extending radially from said actuation collar, said flare area providing a gripping area for actuating said quick connect fitting
wherein said complementary pieces are fastened together to form a single unitary unit;
wherein said fastener has two complementary parts, wherein a first part has protrusions and a second part has perforations such that said protrusions fit inside said perforations.

2. The protective sleeve system of claim 1, wherein each of said sleeve piece can be placed around said quick connect fitting before they can be secured together.

3. The protective sleeve system of claim 1, wherein said sleeve is fabricated of clear plastic.

4. The protective sleeve system of claim 1, wherein said sleeve is fabricated of a flexible material so that it can be pulled over said unmated quick connect.

5. The protective sleeve system of claim 1, wherein said complementary pieces are fastened together with latches.

6. The protective sleeve system of claim 1, wherein said first part with protrusions also comprises a lip that extends out from said protrusions once disposed in said perforations.

* * * * *